United States Patent
Eggink

(10) Patent No.: US 8,542,982 B2
(45) Date of Patent: Sep. 24, 2013

(54) IMAGE/VIDEO DATA EDITING APPARATUS AND METHOD FOR GENERATING IMAGE OR VIDEO SOUNDTRACKS

(75) Inventor: Jana Eggink, Stuttgart (DE)

(73) Assignee: Sony Corporation, Tokyo (JP)

( * ) Notice: Subject to any disclaimer, the term of this patent is extended or adjusted under 35 U.S.C. 154(b) by 285 days.

(21) Appl. No.: 12/961,875

(22) Filed: Dec. 7, 2010

(65) Prior Publication Data

US 2011/0150428 A1 Jun. 23, 2011

(30) Foreign Application Priority Data

Dec. 22, 2009 (EP) .................................... 09015901

(51) Int. Cl.
*H04N 5/93* (2006.01)

(52) U.S. Cl.
USPC ........................................................ 386/285

(58) Field of Classification Search
USPC .......... 386/278, 285, 353, 239, 286; 715/730
See application file for complete search history.

(56) References Cited

U.S. PATENT DOCUMENTS

| | | | |
|---|---|---|---|
| 6,084,169 A * | 7/2000 | Hasegawa et al. | 84/600 |
| 6,687,283 B2 | 2/2004 | Naoe | |
| 7,928,308 B2 * | 4/2011 | Ozaki | 84/615 |
| 8,145,034 B2 * | 3/2012 | Miyajima et al. | 386/241 |
| 8,261,178 B2 * | 9/2012 | Sugiyama | 715/203 |
| 2002/0134219 A1 | 9/2002 | Aoki | |
| 2004/0100487 A1 * | 5/2004 | Mori et al. | 345/724 |
| 2004/0122539 A1 * | 6/2004 | Ainsworth | 700/94 |
| 2005/0158037 A1 * | 7/2005 | Okabayashi et al. | 386/96 |
| 2005/0190415 A1 * | 9/2005 | Ueda | 358/505 |
| 2008/0256100 A1 * | 10/2008 | van de Sluis et al. | 707/100 |
| 2009/0217167 A1 * | 8/2009 | Sugama et al. | 715/727 |

FOREIGN PATENT DOCUMENTS

| | | |
|---|---|---|
| EP | 1 666 967 A1 | 6/2006 |
| EP | 1 102 238 B1 | 8/2006 |
| EP | 1 020 843 B1 | 4/2008 |
| JP | 2001-202082 | 7/2001 |
| WO | 2004/081940 A1 | 9/2004 |

OTHER PUBLICATIONS

Weigang Zhang et al., "A System for Automatic Generation of Music Sports-Video", Proceedings of ICME, 2005, 4 pages.

Jun-Ichi Nakamura et al., "Automatic Background Music Generation based on Actors' Mood and Motions", The Journal of Visualization and ComputerAnimation, vol. 5, 1994, pp. 247-264.

Toshio Modegi, "Automatic Synthesis of Background Music Track Data by analysis of Video Contents", International Symposium on communications and Information Technologies, Oct. 26-29, 2004, pp. 431-436.

* cited by examiner

Primary Examiner — David Harvey
(74) Attorney, Agent, or Firm — Oblon, Spivak, McClelland, Maier & Neustadt, L.L.P.

(57) ABSTRACT

In a video editing apparatus (100) a first video data set describes a first scene in a first video. Among second video data sets describing second scenes contained in a plurality of second videos, third video data sets are identified that represent third scenes having the highest degree of similarity with the first scenes. Audio data sets associated with the third scenes are evaluated. Among a plurality of second audio data sets such audio data sets describing soundtracks having the highest degree of similarity with the first soundtracks may be identified. One of the third audio data sets may be combined with the first video data set to generate a media output data set where an audio track is added to the video data set in accordance with the preferences of the user.

15 Claims, 6 Drawing Sheets

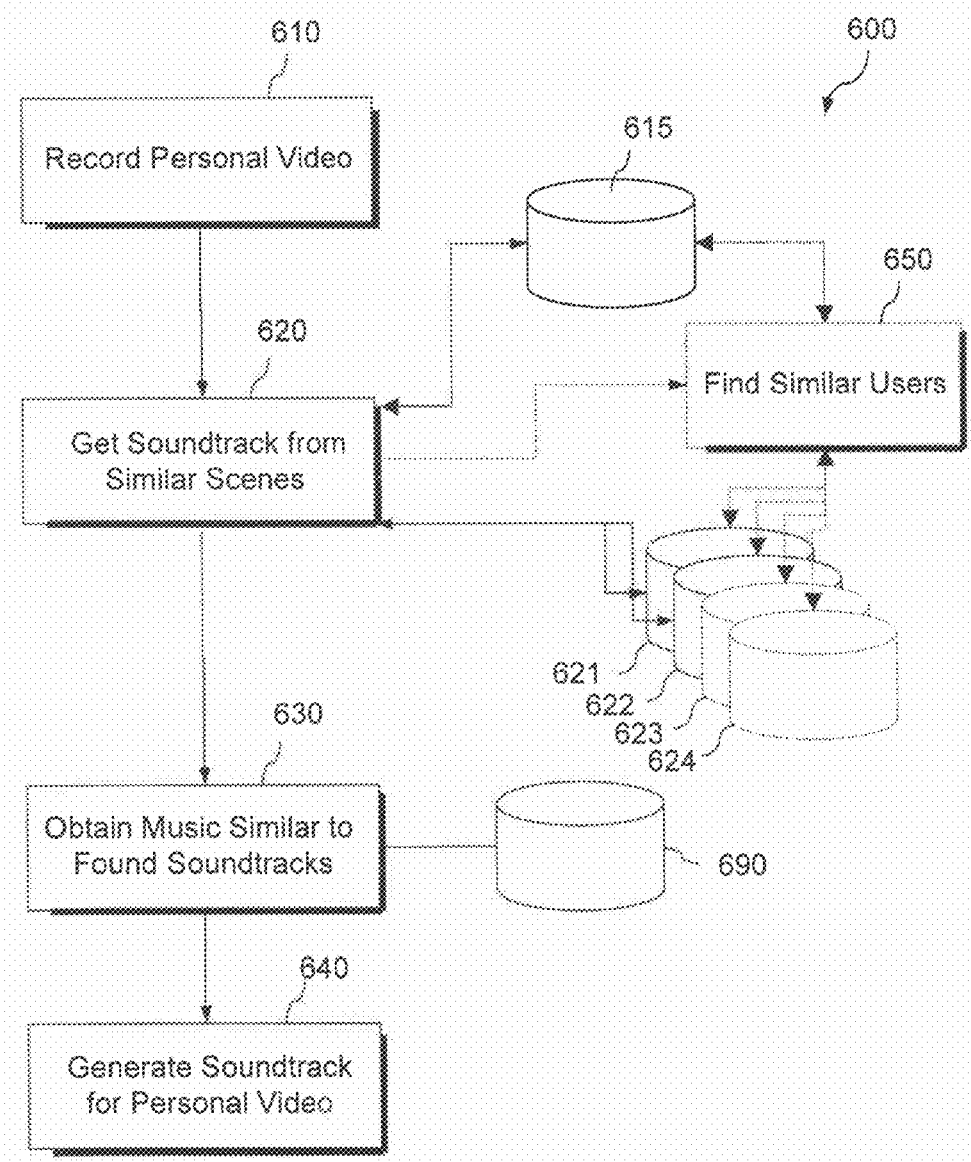

IMAGE/VIDEO DATA EDITING APPARATUS AND METHOD FOR GENERATING IMAGE OR VIDEO SOUNDTRACKS

FIELD OF INVENTION

Embodiments of the invention relate to the field of still-image and video data editing, in particular to generating image or video soundtracks by combining image or video data with suitable audio data.

BACKGROUND

Still-image and video cameras are frequently used by amateurs that typically lack skill and time for adding an appropriate sound track to personal still image galleries or self-made videos.

It is an object of the invention to provide a video editing apparatus and method allowing the user to create variable and interesting image or video soundtracks with less effort and expenditure of time. The object is achieved by the subject matter as claimed in independent claims. More advanced embodiments are defined in the dependent claims.

Details of the invention will become more apparent from the following description of embodiments in connection with the accompanying drawings. The features of the various embodiments may be combined with each other unless they exclude each other.

FIG. 6 is a schematic diagram for illustrating the use of appropriate databases in the course of a video editing procedure in accordance with a further embodiment of the invention.

Figure 1:
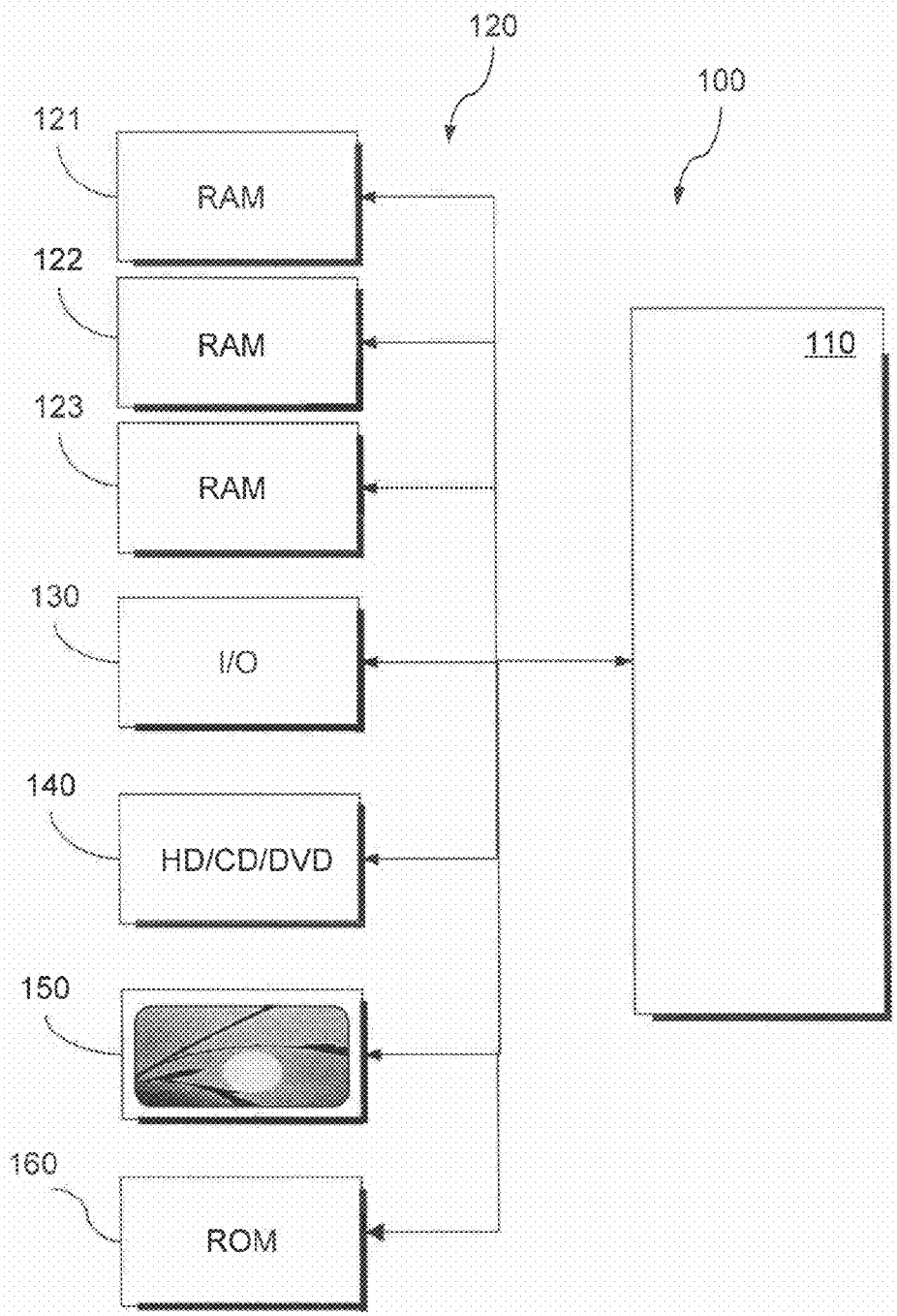
FIG. 1 is a schematic diagram of a video editing apparatus in accordance with an embodiment of the invention.

FIG. 1 illustrates a video editing apparatus 100 that automatically combines a first video data set with an appropriate audio data set for providing a sound track for the first video data set. The appropriate audio data set may represent a complete piece of music, a segment of a piece of music, natural noise, or artificial sounds, by way of example. The appropriate audio data set may be combined with an original audio data set originally contained in the first video data set. For example, the appropriate audio data set may describe a background music added to speech represented by the original audio data set. According to other embodiments, the appropriate audio data set completely replaces the original audio data set.

The video editing apparatus 100 may be a personal computer with video editing software or a consumer device with video editing functionality, for example a television set, a video cassette recorder (VCR), a digital versatile disk (DVD) recorder, a blu-ray decoder, a still image camera, a camcorder or any other consumer electronic device storing video or image data. The video editing apparatus 100 may contain one or more interface units 130 for communicating with other electronic devices and one or more data storage media readers 140, for example a hard disk (HD), a DVD drive, a blu-ray drive, or a computer, via which the video editing apparatus 100 receives media input data describing one still-image, a still-image gallery containing a plurality of still-images, a video clip containing one scene or a movie containing a plurality of scenes. The media input data may be image or video data with or without audio information.

If applicable, a processor unit 110 may partition the media input data, which represents the video data to be edited, into a plurality of first video data sets, wherein each first video data set describes a first scene in the media input data.

The first scene may be one still-image, a sequence of still-images showing the same object or person before the same or before changing background, a sequence of still-images containing the same background, one scene in a professional or amateur movie or a sequence of scenes showing the same objects and persons before the same background, by way of example. The first video data set may be temporally stored in a first portion 121 of a memory unit 120 of the video editing apparatus 100.

A plurality of second video data sets is available to the video editing apparatus 100. The second video data sets may be provided locally or remotely or both locally and remotely. For example, the video editing apparatus 100 may include a first video database that contains all or some of the second video data sets. The first video database may be stored on a data storage medium readable by the data storage media reader 140, or on a data storage medium accessible via the interface unit 130. In accordance with an embodiment, the interface unit 130 may be a communications port via which the video editing apparatus 100 accesses second video databases accessible via the World Wide Web.

The second video data sets may represent complete still-image or complete scenes of amateur videos or professional clips or movies. In accordance with other embodiments, the second video data sets exclusively comprise condensed content-related information describing the contents of second video data sets available on media accessible via the data storage media reader 140 or via the interface unit 130. The second video data sets may be temporally stored in a second portion 122 of the memory unit 120.

The processor unit 110 may be a microcontroller configured to execute a program code stored in a program memory 160. From the memory unit 120 the processor unit 110 obtains the first video data set describing a first scene in a first video represented by the media input data, and the second video data sets describing second scenes contained in a plurality of second videos accessible via the interface unit 130 or the data storage media reader 140.

Among the second video data sets the processor unit 110 identifies third video data sets describing third scenes that have the highest degree of similarity with the first scene. The degree of similarity may be determined on the basis of a video analysis with regard to motion vectors, colour, edge histogram, and frequency of shot boundaries and on the basis of audio analysis referring to the amount and type of noise, speech and the background music present in the video to be edited.

Each second video data set contains audio track segments assigned to individual scenes. The audio track segment can represent a piece of music, speech or natural or artificial background noise. The contents of audio track segments assigned to the third scenes are represented by first audio data sets, for example first pieces of music.

In accordance with an embodiment, only that single scene, which has the highest degree of similarity with the first scene, is identified as single third scene and only the corresponding audio data set is evaluated in the following. In accordance with other embodiments, a certain number of third scenes are identified, for example three, ten or more, and a plurality of first audio data sets are evaluated in the following. Once one or more similar scenes have been found, the soundtracks of this or these scenes are analyzed in order to determine criteria for generating a similar sound track or selecting one from a music database.

For example, among a plurality of second audio data sets that may be stored in one or more music databases accessible via the interface unit 130 or the data storage media reader 140, third audio data sets having the highest degree of similarity with the first audio data set or sets are identified. The degree of similarity between audio data can be determined based on either signal processing techniques or human assigned tags. For example, if the first audio data set represents a first piece of music, the third audio data sets may represent third pieces of music having the same composer or interpreter, or the same or similar instrumentation, musical genre, beat pattern, tempo, rhythm, or time domain, spectral or cepstral features, or the first and third pieces of music may concur in a characteristic acoustic features characterizing the individual perception of a piece of music, wherein the characteristic acoustic feature may be a combination of a plurality of physical signatures.

On the basis of the third audio data sets, the processor unit 110 determines a new soundtrack for the first video data set. For example, one of the third audio data sets, either that one with the highest degree of similarity with the first audio data set or one selected by the user is combined with the first video data set for generating the media output data set containing the first video data set and the third audio data set in the audio track. In accordance with another embodiment, the processor unit 110 may automatically generate a new audio data set concurring with the third audio data sets in features characterizing the individual perception of sound. For example, if the third audio data set describes a piece of music, the processor unit 110 may compose another piece of music concurring therewith in tempo, instrumentation and rhythm, by way of example.

The video editing apparatus 100 may display a video described by the media output data set on a screen 150, may store the media output data set on a data storage medium arranged in a data storage media writer unit or may output the media output data set via the interface unit 130. If the media input data contains more than one first video data set, the processor unit 110 may repeat the procedure for the next video data set representing the next scene, the next sequence of similar scenes, the next sequence of similar still-images or the next still-image. According to other embodiments, the same piece of music that contains the first new audio data set may be applied to the complete media input data.

The video editing apparatus 100 can generate an appropriate soundtrack without assigning the media input data to a predetermined video contents category like sports, romantic, action, or else and goes without training models.

Figure 2:
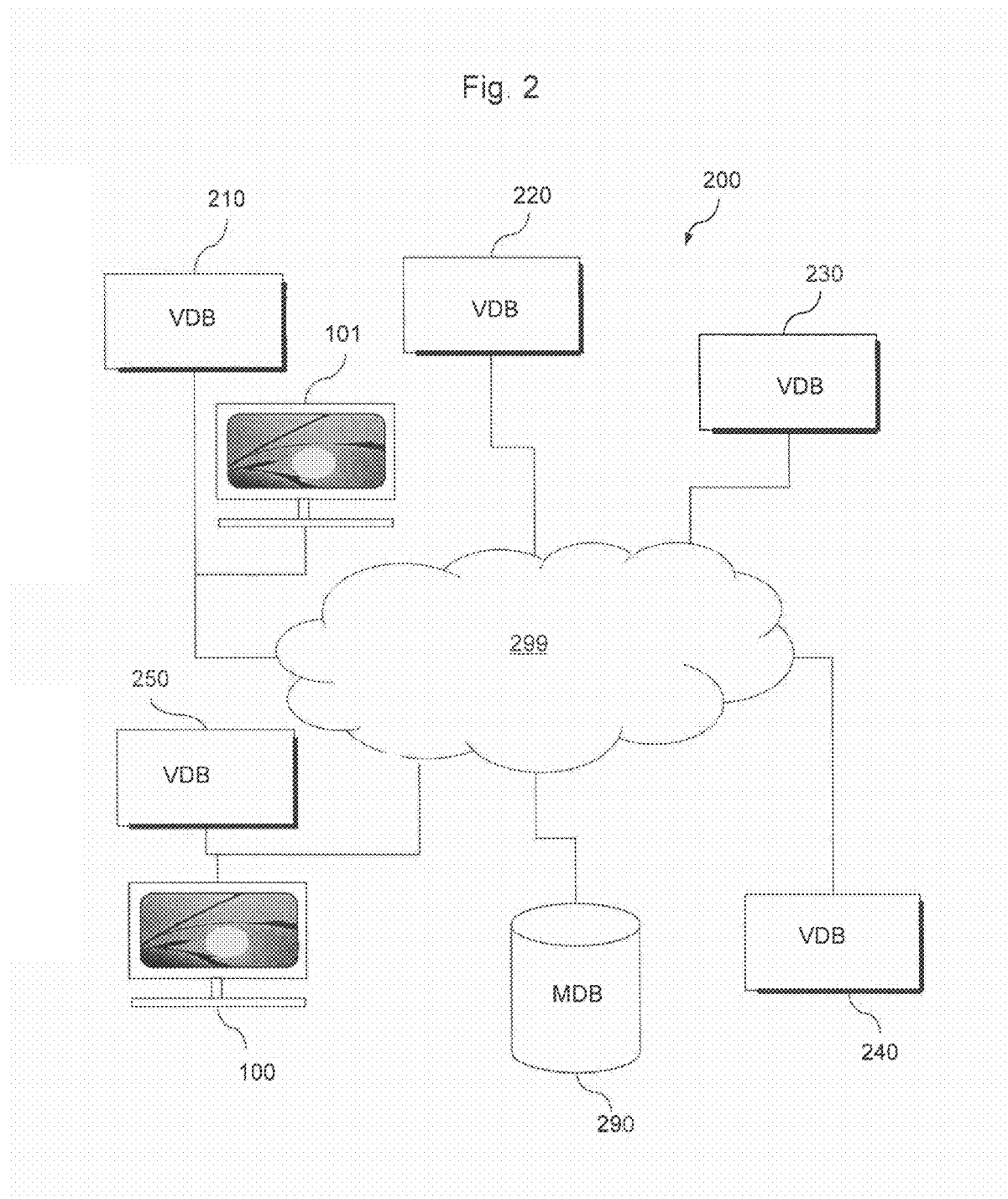
FIG. 2 is a schematic diagram of a video editing system in accordance with a further embodiment referring to the video editing apparatus according to FIG. 1 and remote video and music databases.

FIG. 2 refers to a video editing system 200 including a first video editing apparatus 100 as illustrated in FIG. 1 and at least one further network device providing one or more second video databases 210-240, wherein each second video database 210-240 includes at least a part of the second video data sets in a way that is accessible by the first video editing apparatus 100. The first video editing apparatus 100 and the further network devices may be connected via a communications network 299, which may be a wired or wireless local area network, for example a home-network, or via a network comprising remote components, for example the world wide web. In addition, the video editing system 200 may comprise one or more music databases 290, for example servers of commercial providers or computers of other users.

Accordingly, the video databases 210-240 may provide professional movies, professional image galleries, private videos, and private image galleries. In accordance with other embodiments, the first video editing apparatus 100 and the second video databases 210-240 are assigned to the same user group sharing the same resources, for example the same video and/or music databases.

For example, a user disposing over the first video editing apparatus 100 may share the contents of the video databases 210-240 in the further network devices over which other users of the same group dispose and each of the other users, for example a user disposing over a second video editing apparatus 101 may access a first video database 250 over which the user of the first video editing apparatus 100 disposes.

In accordance with another embodiment, the video editing system 200 comprises at least one processor unit, for example the processor unit of the first video editing apparatus, that evaluates the video databases 210-250 in order to identify similar users having similar music preferences. In accordance with an embodiment, only one of the participants in the video editing system 200 is configured to determine similar users and transmits the results to the other participants. In accordance with other embodiments, each of the further network devices assigned to the video databases 210-250 is configured to determine at least those participating network devices 210-250 that provide databases including soundtracks meeting the music preferences of the respective user.

For this purpose, the respective processor unit identifies among video data sets in the respective local first video database first characteristic video data sets and among video data sets in remote second video databases second characteristic video data sets having the highest degree of similarity with the first characteristic video data sets, respectively. For example the processor unit assigned to a first user identifies in the video databases of the first and a second user sports videos. Then, the video editing apparatus compares the characteristic features of soundtracks of the first characteristic video data sets with the characteristic features of soundtracks of the second characteristic video data sets. Where the characteristic features deviate significantly from each other, the respective video databases are excepted from the search for similar video scenes. As a result such second video data sets which are contained in second video databases that contain second characteristic video data sets with characteristics soundtrack features that do not match with the characteristic soundtrack features of the first characteristic video data are not taken into consideration, when the first user wants to add a soundtrack to a sports or another video.

Figure 3:
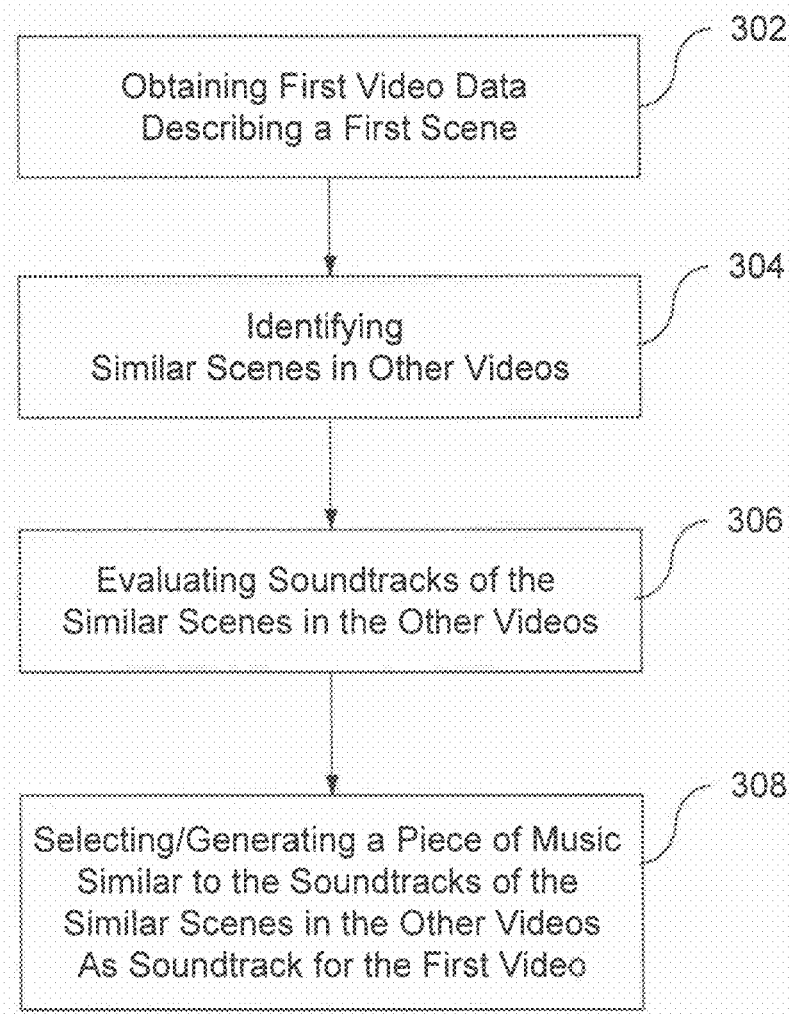
FIG. 3 is a simplified flow chart illustrating a method for editing still-image or video data in accordance with another embodiment.

The simplified flowchart in FIG. 3 illustrates a method for editing still-image and video data sets. The method may be performed at a video editing apparatus according to FIG. 1 or a video editing system according to FIG. 2. A data source supplies media input data describing, for example, one still-image, a sequence of still-images, a professional movie or an amateur video movie including one or more scenes. From the media input data one or a plurality of first video data sets is obtained. For example, a movie or video clip may be segmented into a sequence of scenes, wherein each scene is assigned to a first video data set. Each first video data set describes a segment from the media input data to which a typical user typically applies the same soundtrack, which may be natural background noise or a piece of music or a combination thereof. For example, in a presentation of a sequence of still-images, one video data set may be assigned to exactly one still-image or to a sequence of consecutive still-images in which the same persons or objects appear in the foreground or a consecutive sequence of still-images having in substance the same background. With regard to movies or video clips, each first video data set may represent a video segment between two cuts or a segment in which the same persons or main objects appear in the foreground.

After having obtained a first video data set which describes a first scene in a first video, among a plurality of second video data sets describing second scenes which may be contained in a plurality of second videos, third video data sets are identified, wherein the third video data sets describe third scenes which have the highest degree of similarity with the first scene. The degree of similarity may be determined for each second scene by means of a similarity value representing the degree of similarity between the respective second scene and the first scene. The similarity value may be determined based exclusively on video analysis, exclusively on audio analysis or on a combination of both. The video analysis may comprise the analysis of motion, colour, edge histogram, frequency of shot boundaries and contents. The audio analysis may be based on the amount and type of background noise, speech, speaker person and the music contained in the media input data.

Then, first audio data sets describing first soundtracks associated with the third scenes are evaluated. In other words, once a similar scene is found, the soundtrack of the scene can be analyzed. For example, a characteristic audio feature of that third audio data set describing that third soundtrack having the highest degree of similarity with the first soundtracks is determined. According to other embodiments, the characteristic audio features of a plurality of soundtracks having the highest degree of similarity with the first soundtrack are determined based on signal processing or human assigned tags.

On the basis of the third audio data sets an appropriate new audio data set for the first video data set is determined. For example, one of the third audio data sets is selected as the new audio data set, either automatically or by a user prompt. The selected third audio data set is combined with the first video data set to generate a media output data set comprising the first video data and the third audio data set. In accordance with another embodiment, the processor unit 110 may automatically generate the new audio data set such that it concurs with the third audio data sets in features characterizing the individual perception of sound. For example, if the third audio data set describes a piece of music, another piece of music may be composed which concurs therewith in tempo, instrumentation and rhythm, by way of example.

The new audio data set can represent natural background noise or a piece of music. The new audio data set can replace the original soundtrack of the first video data set completely or it can be combined with it. For example the method provides analyzing the original soundtrack. If the method detects speech in the original soundtrack, the new audio data can be added as quiet background music such that the speech remains comprehensible. If the method detects music in the original soundtrack, the method may provide to add no new audio data at all. If the method detects only noise, the noise may be maintained, maintained in an attenuated manner, or deleted when the new audio data is added. If the method detects speech and background noise like wind or motors, the background noise may be reduced, for example by spectra subtraction using an estimated noise profile when the new audio data is added.

The second video data sets can be contained in either a personal collection of previously edited videos or in databases provided by other users communicating with the video editing apparatus, or a database providing professional movies, in particular movies the user prefers. The method can be executed in a fully automated manner without any further user interaction or in a semi-automatic manner requiring a minimum of user interaction. In each case, a complex and typically error-prone semantic analysis assigning the video or image to a predefined category can be avoided.

In accordance with another embodiment the method uses collaborated filtering techniques wherein among video data sets in a first video database, for example the user database, first characteristic video data sets are identified and among the videos in second video databases second characteristic video data sets having the highest degree of similarity with the first characteristic video data sets are identified respectively. The first characteristic video data sets may be, by way of example, video data sets describing a certain kind of sports. Then, characteristic features of soundtracks assigned to the first characteristic video data sets are compared with the characteristic features of the soundtracks assigned to the second characteristic video data sets. If second video data sets are identified which characteristic soundtrack features do not match well with the characteristic soundtrack features of the first characteristic video data sets, the second video databases containing such second video data sets are excepted from the search algorithm which identifies the third scenes similar to the first scenes in the first video data set. In this way, the system identifies similar users and can restrict a search for a soundtrack to that users that have been identified as user sharing the same or having similar preferences.

In addition to taking over elements determining the acoustic perception, the method may also provide taking over visual effects like scene transitions, or slow motion, fast forward, false colour or soft-focus effects, by way of example, from the third scenes into the first scene.

Figure 4:
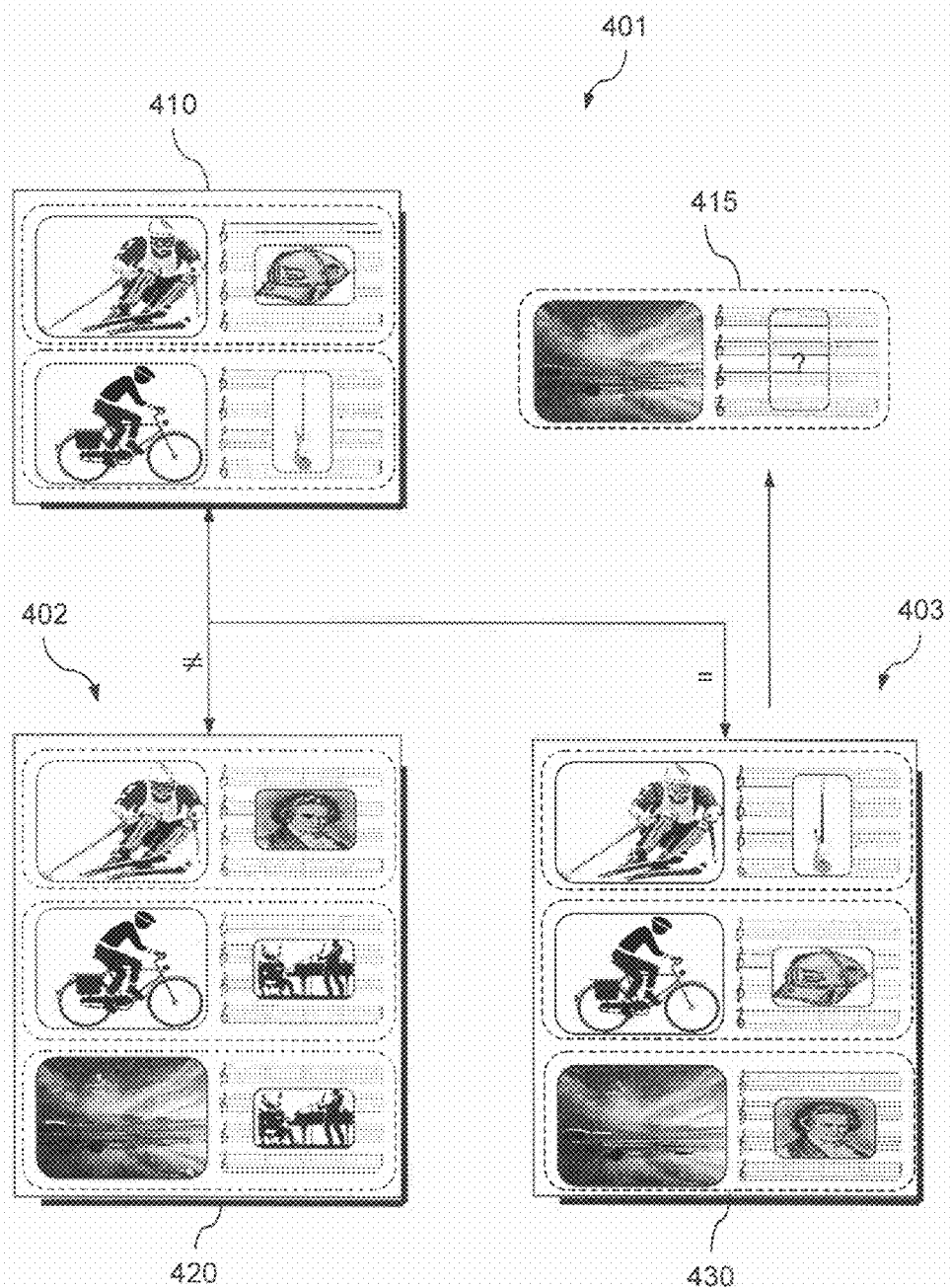
FIG. 4 is a schematic diagram referring to database contents for illustrating a method of editing video data including identification of appropriate databases.

According to the embodiment illustrated in FIG. 4, a first user 401 uses a video editing apparatus and disposes over a first database 410. The first database 410 contains a characteristic video data set containing skiing videos to which rap music is added and biking videos to which rock music is added. A second user 402 disposes over a second database 420 including characteristic video data sets referring to skiing, biking and landscapes. The second user 402 has added classic music to the skiing videos and jazz music to both the biking and landscape videos. A third user 403 disposes over a third video database 430 containing videos referring to skiing, biking and landscape. The third user 403 has added rock music to the skiing videos, rap music to the biking videos and classic music to the landscape video.

The first user 401 wants to let automatically add a soundtrack to media input data representing, for example a gallery of landscape still-images. In both the second video database 420 and the third video database 430 landscape videos could be identified as being similar to the landscape still-images. However, using collaborate filtering the system will recognize that the preferences of the second user 402 do not match well with the preferences of the first user 401, whereas the music preferences of the third user 403 match better with the preferences of the first user 401. The system will except the second video database 420 from the search for similar scenes and will analyze the soundtrack of the landscape video in the third video database 430. Then the system will search in a music database for a piece of music that has a high degree of similarity with the piece of classic music forming the soundtrack of the landscape video contained in the third video database 430.

Figure 5:
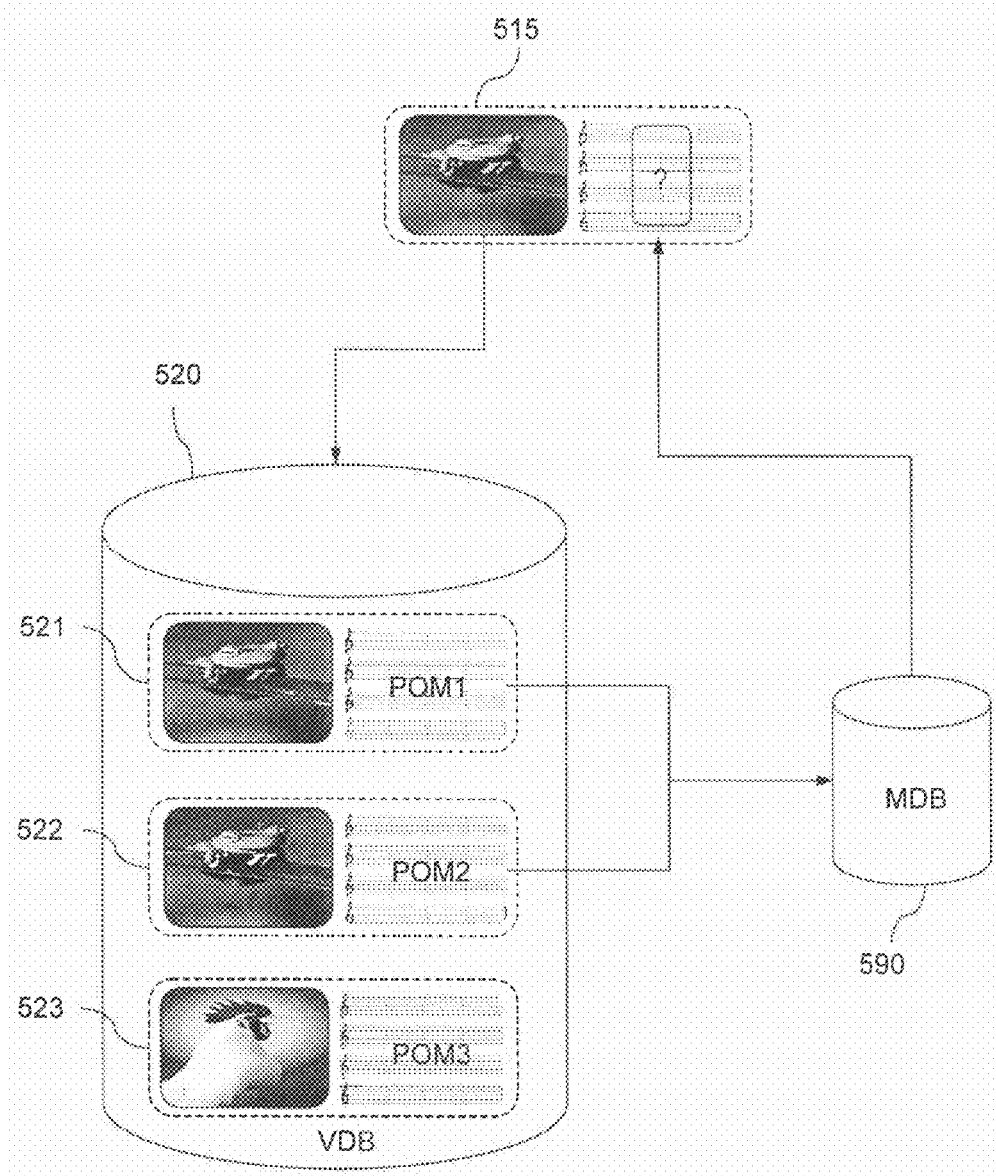
FIG. 5 is a schematic diagram referring to database contents for illustrating a method for editing video data in accordance with an embodiment providing a certain type of music for a certain type of object appearing in the still image/video data.

FIG. 5 refers to a further embodiment according to which the first and second scenes are analyzed with regard to the appearance of persons or objects. The similarity is then determined on the basis of a similarity between persons and objects appearing in the first scene and persons and objects appearing in the second scenes. In this way a similar or the same piece of music, a "theme", may be applied to the same person in different videos or still-images galleries.

For example, a user intends to let automatically select or generate a soundtrack to a first scene 515 in which a first animal species appears. Then the system searches in a video database 520, which may be the video database of the user or a remote video database, for scenes or images in which a similar or the same animal species appears. In embodiments referring to persons instead of animals, the similarity may be determined using face and/or voice recognition.

According to the embodiment illustrated in FIG. 5, the stored video data sets 521, 522 are identified as referring to the same animal species. The soundtrack contained in the first stored video data set 521 contains a first piece of music POM1 and the soundtrack contained in the second stored video data set 522 comprises a second piece of music POM2. The system searches in a music database 590 for pieces of music which are available and which have the highest degree of similarity with both pieces of music, for example the first piece of music, the second piece of music, or another piece of music being similar to both the first and the second piece of music.

FIG. 6 gives an overview of the conception of a video editing system 600 according to another embodiment. A user may record a new personal video (610). If applicable, but not necessarily, the video editing system 600 partitions the new personal video into video data sets assigned to individual scenes. Then the system 600 gets information about soundtracks from similar scenes in other videos contained in a plurality of local or remote video databases 621 to 624 (620). The system may search for and obtain music similar to the soundtracks in the found similar scenes (630). The music may be obtained from one of a plurality of local and/or remote databases 690. Then the system 600 generates a soundtrack for the newly recorded personal video on the basis of music obtained from the music database 690. The obtained music may be a similar piece of music available in the music database 690 or a newly composed piece of music.

Adding music to a still-image gallery or a video may be fully automated. In accordance with other embodiments, a small number of selected pieces of music, all in agreement with his preferences, may be presented to the user and the user can select one of them in a comfortable way.

According to an embodiment, users having similar music preferences are identified before the second video databases are searched for similar scenes. For this purpose, the contents of a first video database 615 assigned to the user having recorded the new personal video are compared with the contents of the available video databases 621 to 624. Video databases containing video data sets having soundtracks that do not meet the preferences of the user are marked and not searched for similar scenes.

The invention claimed is:

1. A method of operating a video editing apparatus, the method comprising:
   obtaining a first video data set describing a first scene in a first video;
   identifying, at the video editing apparatus among second video data sets describing second scenes contained in a plurality of second videos, third video data sets describing third scenes having the highest degree of similarity with the first scene, wherein identifying the third video data sets includes
      determining, for each second scene, a similarity value representing the degree of similarity with the first scene; and
      selecting the second scenes with the highest similarity values as the third scenes;
   evaluating first audio data sets describing first soundtracks associated with the third scenes; and
   combining the first video data set with a new audio data set based on at least one of the first audio data sets for generating a media output data set having the first video and new audio data sets.

2. The method of claim 1, further comprising:
   identifying, among a plurality of second audio data sets, third audio data sets representing third soundtracks having the highest degree of similarity with the first soundtracks,
   wherein the new audio data set is one of the third audio data sets.

3. The method of claim 2, wherein identifying the third audio data sets includes
   determining a characteristic acoustic feature of the first and second audio data sets, and
   determining the highest degree of similarity between first and second audio data sets on the basis of the characteristic acoustic feature.

4. The method of claim 1, wherein the new audio data set is a newly generated audio data set concurring with the first audio data sets in acoustic features characterizing the individual perception of a piece of sound.

5. The method of claim 1, wherein the second video data sets are provided in a first video database over which a user of the video editing apparatus disposes.

6. The method of claim 1, wherein the second video data sets are provided in at least one second video database over which the user does not dispose, wherein each second video database is provided in a remote storage apparatus connected to the video editing apparatus via a communications network.

7. The method of claim 6, wherein
   the first video set is contained in a first video database having a first contents characteristic and wherein each second video database has a second contents characteristic, and wherein the method further comprises:
   excepting second videos contained in second video databases with second contents characteristics that do not match with the first contents characteristic from identifying the third scenes.

8. The method of claim 7, further comprising:
   determining the first and second contents characteristics at the video editing apparatus.

9. The method of claim 7, further comprising
   identifying, among video data sets in the first video database, first characteristic video data sets and, among videos in each second video database, second characteristic video data sets having the highest degree of similarity with the first characteristic video data sets;
   comparing characteristic acoustic features of soundtracks of the first characteristic video data sets with the characteristic acoustic features of soundtracks of the second characteristic video data sets; and
   excepting second video data sets contained in second video databases containing second characteristic video data sets with characteristic acoustic features that do not match with the characteristic acoustic features of the first characteristic video data sets from identifying the third scenes.

10. The method of claim 1, wherein determining the similarity values includes analyzing the first and second scenes to identify persons or objects appearing therein and determining the similarity values on the basis of the appearances of persons and objects in the first and the second scenes.

11. A video editing apparatus comprising:
a memory unit; and
a processor unit connected with the memory unit and configured to
obtain from the memory unit a first video data set describing a first scene in a first video and second video data sets describing second scenes contained in a plurality of second videos;
identify, among the second video data sets, third video data sets describing third scenes having the highest degree of similarity with the first scene, wherein identifying the third video data sets includes
determining, for each second scene, a similarity value representing the degree of similarity with the first scene; and
selecting the second scenes with the highest similarity values as the third scenes;
evaluate first audio data sets describing first soundtracks assigned to the third scenes; and
combine the first video data set with a new audio data set based on at least one of the first audio data sets for generating a media output data set having the first video data and the new audio data set.

12. The video editing apparatus of claim 11, wherein the processor unit is further configured to
identify, among a plurality of second audio data sets, third audio data sets describing third soundtracks having the highest degree of similarity with the first soundtracks; and to
select one of the third audio data sets as the new audio data set.

13. A video editing system comprising:
a video editing apparatus including a memory unit; and
a processor unit connected with the memory unit and configured to
obtain from the memory unit a first video data set describing a first scene in a first video and second video data sets describing second scenes contained in a plurality of second videos;
identify, among the second video data sets, third video data sets describing third scenes having the highest degree of similarity with the first scene, wherein identifying the third video data sets includes
determining, for each second scene, a similarity value representing the degree of similarity with the first scene; and
selecting the second scenes with the highest similarity values as the third scenes;
evaluate first audio data sets describing first soundtracks assigned to the third scenes; and
combine the first video data set with a new audio data set based on at least one of the first audio data sets for generating a media output data set having the first video data and the new audio data set,
and at least one further network device configured to provide a video database including at least some of the second video data sets in a way accessible by the video editing apparatus, wherein the video editing apparatus and the further network device are connected via a communications network.

14. The video editing system of claim 13, further comprising:
a processor unit configured to
identify, among video data sets in the first video database, first characteristic video data sets and, among videos data sets in each second video database, second characteristic video data sets having the highest degree of similarity with the first characteristic video data sets;
compare characteristic acoustic features of soundtracks of the first characteristic video data sets with the characteristic acoustic features of soundtracks of the second characteristic video data sets; and
except second video data sets contained in second video databases containing second characteristic video data sets with characteristic acoustic features that do not match with the characteristic acoustic features of the first characteristic video data sets from identifying the third scenes.

15. A method of operating a video editing apparatus, the method comprising:
obtaining a first video data set describing a first scene in a first video;
identifying, at the video editing apparatus among second video data sets describing second scenes contained in a plurality of second videos, third video data sets describing third scenes having the highest degree of similarity with the first scene;
evaluating first audio data sets describing first soundtracks associated with the third scenes; and
combining the first video data set with a new audio data set based on at least one of the first audio data sets for generating a media output data set having the first video and new audio data sets,
wherein
the second video data sets are provided in at least one second video database over which the user does not dispose, wherein each second video database is provided in a remote storage apparatus connected to the video editing apparatus via a communications network,
the first video set is contained in a first video database having a first contents characteristic and wherein each second video database has a second contents characteristic, and
the method further comprises:
excepting second videos contained in second video databases with second contents characteristics that do not match with the first contents characteristic from identifying the third scenes.

* * * * *